US008966052B2

(12) United States Patent
DelRegno et al.

(10) Patent No.: US 8,966,052 B2
(45) Date of Patent: Feb. 24, 2015

(54) ERROR DETECTION AND REPORTING

(75) Inventors: Nick DelRegno, Rowlett, TX (US);
Scott R. Kotrla, Wylie, TX (US); David E. McDysan, Great Falls, VA (US);
Michael U. Bencheck, Denison, TX (US); Matthew W. Turlington, Richardson, TX (US); Ross S. Hardin, Plano, TX (US); Richard C. Schell, Allen, TX (US); Howard Chiu, Plano, TX (US); William Drake, Garland, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 2198 days.

(21) Appl. No.: 10/859,463

(22) Filed: Jun. 2, 2004
(Under 37 CFR 1.47)

(65) Prior Publication Data

US 2006/0143548 A1    Jun. 29, 2006

Related U.S. Application Data

(60) Provisional application No. 60/560,009, filed on Apr. 5, 2004.

(51) Int. Cl.

| G06F 15/16 | (2006.01) |
|---|---|
| H04M 3/30 | (2006.01) |
| H04M 3/10 | (2006.01) |
| H04L 1/00 | (2006.01) |
| H04M 3/08 | (2006.01) |
| H04M 3/22 | (2006.01) |

(52) U.S. Cl.
CPC ............... *H04M 3/301* (2013.01); *H04M 3/10* (2013.01); *H04M 3/085* (2013.01); *H04M 3/2209* (2013.01)
USPC ........................... 709/224; 370/241; 370/249

(58) Field of Classification Search
USPC ........................................................ 709/224
See application file for complete search history.

(56) References Cited

U.S. PATENT DOCUMENTS

| 5,784,359 | A | * | 7/1998 | Bencheck et al. ............. 370/244 |
|---|---|---|---|---|
| 6,151,390 | A | * | 11/2000 | Volftsun et al. ............... 379/229 |
| 6,363,319 | B1 | * | 3/2002 | Hsu ............................... 701/533 |

(Continued)

FOREIGN PATENT DOCUMENTS

| GB | 2369911 | 6/2002 |
|---|---|---|
| JP | 2002-094541 | 7/2002 |
| JP | 2003-087291 | 3/2003 |

(Continued)

OTHER PUBLICATIONS

Langowski, "VoDSL", Cahners Business Information, vol. 27, No. 4, Apr. 2001, pp. 44-54.

*Primary Examiner* — Dhairya A Patel
*Assistant Examiner* — Alan S Chou

(57) ABSTRACT

System and method for detecting and reporting an error in communications with customer premise equipment. A preferred embodiment comprises monitoring the communications link between an access device and customer premise equipment located on customer premises. If a communications link fails, or some other condition occurs, an error signal is transmitted to the access network to notify downstream network elements of the error condition. In one embodiment, an access device is communicatively coupled to a demarcation device via an Ethernet link. If a loss of link occurs on the Ethernet link, an error signal, such as an alarm indicator signal, is transmitted through the network.

22 Claims, 4 Drawing Sheets

(56) References Cited

U.S. PATENT DOCUMENTS

| | | |
|---|---|---|
| 6,400,803 B1 | 6/2002 | Tate et al. |
| 2003/0043753 A1* | 3/2003 | Nelson et al. ................. 370/249 |
| 2004/0010569 A1 | 1/2004 | Thomas et al. |
| 2004/0165533 A1* | 8/2004 | Izundu et al. ................. 370/241 |

FOREIGN PATENT DOCUMENTS

| | | |
|---|---|---|
| WO | 01/67804 | 9/2001 |

* cited by examiner

ON LOSS OF ETHERNET LINK:
X1, X2 = "0"
C1, C2, C3 = "1"
84 INFO BITS = REPEATING "10" BIT PATTERN

ERROR DETECTION AND REPORTING

PRIORITY CLAIM AND CROSS-REFERENCE TO RELATED APPLICATIONS

The present application claims priority to U.S. Provisional Patent Application Ser. No. 60/560,009, filed Apr. 5, 2004, entitled "System and Method for Using Labeled Flows in a Communications Access Network," assigned to the assignee of the present application and incorporated herein by reference its entirety.

The present application is also related to the following co-pending applications, which are assigned to the assignee of the present application and incorporated herein by reference in their entireties:

U.S. patent application Ser. No. 10/858,502, filed on Jun. 1, 2004 and entitled "System and Method for a Communications Access Network;"

U.S. patent application Ser. No. 10/858,501, filed on Jun. 1, 2004 and entitled "System and Method for Controlling Communication Flow Rates;"

U.S. patent application Ser. No. 10/858,491, filed on Jun. 1, 2004 and entitled "Apparatus and Method for Terminating Service Emulation Instances;"

U.S. patent application Ser. No. 10/858,503, filed on Jun. 1, 2004 and entitled "Method and Apparatus for Processing Labeled Flows in a Communications Access Network;"

U.S. patent application Ser. No. 10/858,517, filed on Jun. 1, 2004 and entitled "System and Method for Providing a Multiple-Protocol Crossconnect;"

U.S. patent application Ser. No. 10/859,057, filed concurrently herewith and entitled "Providing Applets to Remote Devices in a Communications Network;"

U.S. patent application Ser. No. 10/858,868, filed concurrently herewith and entitled "System and Method for Monitoring, Controlling and Provisioning a Telecommunications Access Network;"

U.S. patent application Ser. No. 10/859,468, filed concurrently herewith, now U.S. Pat. No. 7,710,888, and entitled "Apparatus and Method for Testing and Fault Isolation in a Communication Network;"

U.S. patent application Ser. No. 10/858,525, filed on Jun. 1, 2004 and entitled "System and Method for Managing Communications In An Access Network."

TECHNICAL FIELD

The present invention relates generally to a system and method of managing access network elements, and more particularly to a system and method for reporting errors regarding Ethernet devices in a network environment.

BACKGROUND

A commercial telecommunications network operated by a service provider typically supports voice and/or data communications between various customer locations served by the network. An overall communications system may be subdivided into an access network and a core network, which may or may not be owned and operated by different service providers. Generally, customer devices communicatively couple to the access network which, in turn, connects to the core network. The access network includes what many people refer to as "the last mile," that is, the connectivity from a customer location, such as an office building, to a point where a service provider has significant facilities, such as a metro hub or a "service edge" at the periphery of the core network.

In contrast to the access network, the core network usually provides transport of large aggregate flows over long distances and handles the selective routing of each customer's voice and data traffic to other locations served by the network.

An access network generally comprises communications links, switches, aggregators, multiplexors, demultiplexors, routers, hubs, and the like which provide connectivity between the customer's equipment and the core network's service edge. In a complicated network architecture involving a large number and variety of equipment and a number of possible points of failure, it is important to a service provider to be able to quickly and efficiently isolate problems or failures in the network. Problems may include a failed piece of equipment, a cut cable, or the like. Many systems are currently employed by existing service providers to provide alarms or warnings when a piece of equipment fails or is suffering degraded performance and may be about to fail. The existing systems are generally focused on monitoring the operational status of the network equipment, such as the switches, aggregators, multiplexors, demultiplexors, routers, amplifiers, and the like located in the service provider's facilities or collocated at facilities operated by a telephone company. These systems, however, fail to indicate when problems exist in equipment installed in the customer's site. Consequently, when a customer experiences loss of access connection to a service provider, a customer may often assume that the problem resides in the service provider's facilities when the problem may actually be in the customer's network or at the point where the customer connects to the service provider's facilities at the customer location.

A common network protocol used by customers is Ethernet. Ethernet provides a cost effective and easy to implement solution for the customers' networking needs, such as LAN and WAN capabilities. A company may have an Ethernet LAN with a port of a network switch or bridge being communicatively coupled to an access switch via a Very high bit-rate Digital Subscriber Line (VDSL), a 10/100 Ethernet, a Gigabit-Ethernet (GbE), or the like. There is no mechanism, however, to indicate when the access switch has lost connectivity to the router. Thus, if the physical cable on the customer's router becomes disconnected or damaged for some reason, errors would be propagated throughout the system as each device would begin to see problems in the communications with the customer's equipment. Many times, the errors generated by the network would provide no probative value in isolating the cause of the problem to a disconnected cable.

To isolate and correct these problems, it is common for service providers to dispatch equipment and service personnel to one or more sites to perform on-site diagnostic tests. Such an error-recovery procedure is time consuming and expensive, particularly when the problem may actually be that the cable connected to the customer's router or switch has simply became disconnected. Thus, there is a need to indicate when connectivity between the access switch and the customers' equipment fails or to detect and isolate other types of fault conditions.

SUMMARY OF THE INVENTION

These and other problems are generally solved or circumvented, and technical advantages are generally achieved, by preferred embodiments of the present invention which provides fault or error conditions in communications links between an access device and customer premise equipment. Error conditions may include such problems as open or shorted electrical circuits, damaged or severed optical connections, interfering signals, and hardware malfunctions or misconfigurations.

In accordance with a preferred embodiment of the present invention, a method for indicating an error or fault condition in the communications link between an access device and one or more customer premise equipment is provided. The method includes the steps of configuring an access device to communicate with a customer premise equipment and monitoring the communications link for an error or fault condition. In one embodiment, the communications with the customer premise equipment are via a demarcation device. If an error condition or a fault condition is detected, such as, for example, a loss of link, the access device transmits an alarm signal to a switch, thereby notifying downstream network elements of the error or fault condition.

In accordance with another method embodiment of the present invention, customer premise equipment is communicatively coupled to a first port of an access device. If an error or fault condition is detected on the first port, then an alarm signal is transmitted on the second port.

In accordance with another preferred embodiment of the present invention, an access device that detects and reports an error or fault condition on a communications link to customer premise equipment is provided. The access device monitors a first port configured for communications to customer premise equipment. If an error or fault condition is detected, then an alarm signal is transmitted to a switch communicatively coupled to a second port.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed herein are merely illustrative of specific ways to make and use the invention, and do not limit the scope of the invention.

The present invention will be described with respect to preferred embodiments in a specific context, namely, providing error notification of a failed Ethernet communications link between an access device and a demarcation device. The invention may also be applied, however, to other types of communications links, such as, for example, a serial link, a parallel link, another network link, a direct connection, or the like. Furthermore, while specific access networks are illustrated and discussed herein, it is noted that network configurations may vary to include fewer or additional elements, such as routers, gateways, bridges, ATM switches, frame relay switches and the like. The illustrated embodiments are provided for illustrative purposes only and are provided only to aid in the explanation and understanding of the concepts of the present invention. Accordingly, aspects of the present invention are equally applicable to many types and configurations of networks and communications protocols.

It is further noted that, unless indicated otherwise, all functions described herein may be performed in either hardware or software, or some combination thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
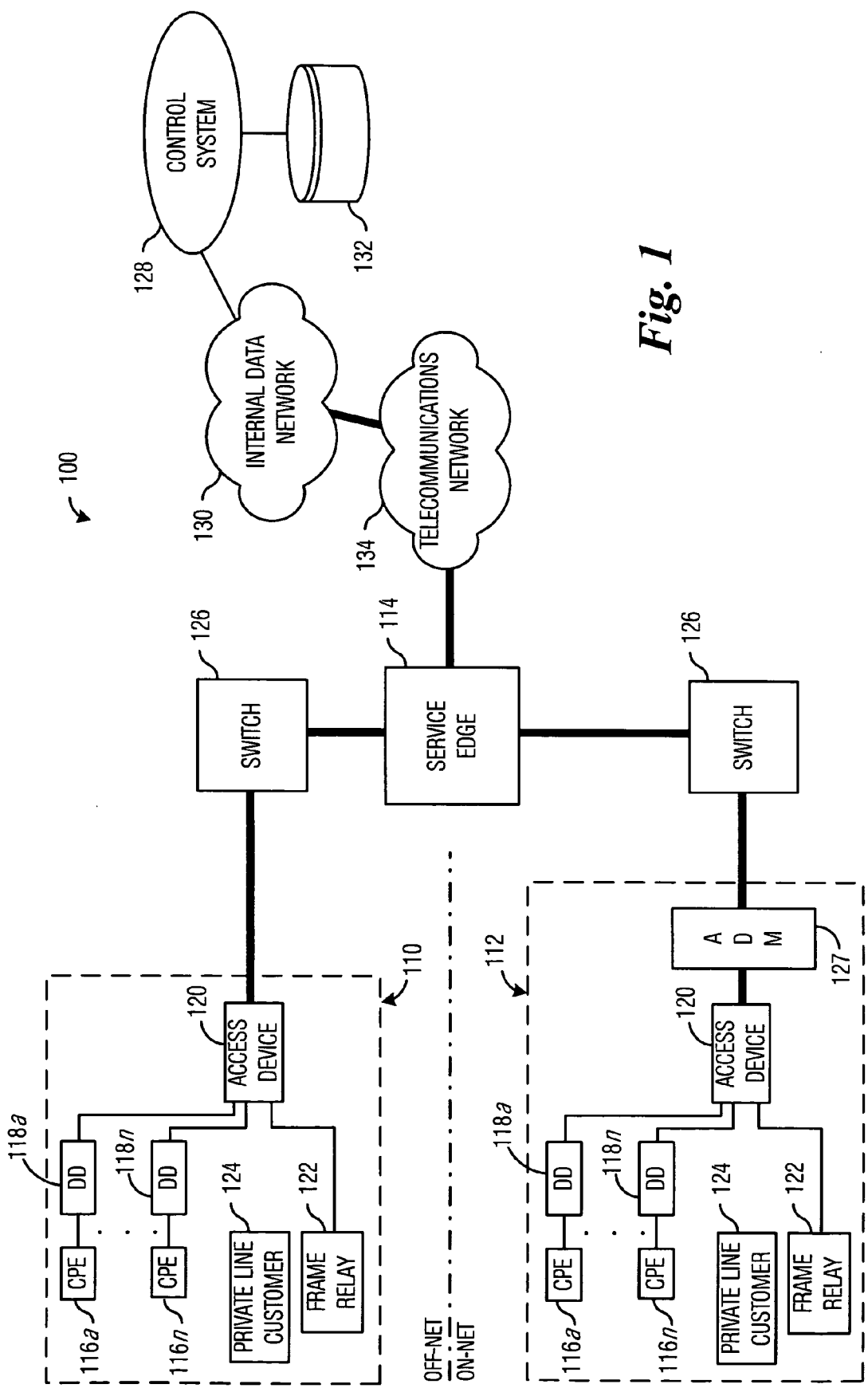
FIG. 1 is a network diagram of an access network embodying features of the present invention.

Referring now to FIG. 1, reference numeral 100 designates an access network diagram embodying features of one embodiment of the present invention. It should be noted that the network diagram 100 has been simplified to better illustrate features of the present invention. Well-known elements have not been shown, but are nonetheless part of a communications network embodying features of the present invention.

The access network diagram 100 illustrates one embodiment of an access network in which customer premise equipment (CPE), such as CPE 116a . . . 116n located in office buildings 110 and 112, may connect to a service edge 114. It should be noted that the illustrated embodiment is discussed in terms of an office building for illustrative purposes only. Office buildings 110, 112 represent customer locations requiring communication services via the access network 100. In other embodiments, office buildings 110, 112 may be a single-dwelling house, an apartment complex, a multi-tenant building, a corporate campus, or the like.

Furthermore, the service edge 114 is illustrated as a single network element for illustrative purposes only, and may include two or more network elements. Likewise, the communication path between the buildings 110, 112 and the service edge 114 is illustrated as a simple two-hop connection for illustrative purposes only. The communication path between buildings 110, 112 and the service edge 114 may contain additional or fewer hops, and may include different paths for unidirectional traffic.

Typically, each of the CPE 116a . . . 116n comprise a router coupled to other devices such as other routers, hubs, workstations, or the like. Typically, it is expected that the CPE 116a . . . 116n is customer-owned equipment comprising a router or a firewall. Workstations, personal computers, or other user devices may communicatively couple to the router or firewall to access the service edge 114. Other devices, however, may be communicatively coupled to the demarcation devices 118.

In a typical embodiment, it is expected that each floor in office buildings 110, 112 or each customer may have a demarcation device (DD) 118a ... 118n that is communicatively coupled to CPE 116a ... 116n, respectively. Depending upon the height of the building and the lengths of the cables runs, some additional components, such as repeaters and amplifiers, may be required. The demarcation devices 118a ... 118n represent the end of the access network 100 and the point at which the customer connects to the access network 100.

The demarcation devices 118a ... 18n are communicatively coupled to an access device 120, which provides switching and access services to the CPE 116a ... 116n. A typical connection between the demarcation devices 118a ... 118n and the access device 120 includes Ethernet via 100BT, 100FX, GbE, VDSL, or the like. In other embodiments, the access device 120 may be capable of coupling to other types of devices. For example, a customer may require connectivity to a frame relay (FR), such as frame relay 122, via a DS1 connection. Other customers, such as a private line customer 124, may also require a DS1 connection. Other types of connections may be used as required to support specific customers' needs.

On the network side, the access device 120 is preferably communicatively coupled to one or more hubs or switches, represented by switch 126 in FIG. 1, to provide connectivity between the office buildings 110, 112 and the service edge 114. The communications link between the access device 120 and the switch 126 may, for example, be a DS3 link. Preferably, the access device 120 also provides aggregation and translation services between the CPE 116a ... 116n and the access network. As noted above, customers within a building may require different types of access, or a single customer may require different types of access for different services. In these situations, it is preferred to utilize an access device that is capable of aggregating communications having multiple formats dependent upon the customer requirements and adapting the communications to a format suitable for transmission in the access and core networks.

One such access device 120 is disclosed in U.S. patent application Ser. No. 10/858,503, entitled "Method and Apparatus for Processing Labeled Flows in a Communications Access Network", which is incorporated herein by reference. An example of a switch 126 that may be used in accordance with one embodiment of the present invention is disclosed in U.S. patent application Ser. No. 10/858,517, entitled "System And Method For Providing A Multiple-Protocol Crossconnect", which is incorporated herein by reference. Other access devices 120 and switches 126 may be used.

Additional network elements may be positioned between the access device 120 and the switch 126. For example, in an "on-network" scenario wherein the access network is owned by the core network service provider, an add/drop multiplexor (ADM), such as ADM 127, may be utilized. Frequently, service is provided to a building via an OCn link, such as an OC12 or OC48 optical link, but the access device, such as the access device referred to above, is equipped with a smaller link, such as DS3 link. Thus, the ADM 127 provides a mechanism for the DS3 traffic from the access device to be separated from and interjected onto the larger OCn link. It should be noted that the "off-network" scenario frequently does not require additional equipment at the customer's site. One reason for this is that the communications link from the access network is generally leased as a DS3. The leased DS3 may then couple directly to the access device. An ADM or other suitable element (not shown) may be provided in the access network as needed.

A control system 128 and an internal data network (IDN) 130 provide management and control connectivity, preferably via the telecommunications network 134. It should be noted that the IDN 130 is physically implemented as a collection of interconnected network nodes, such as switches, bridges, ATM switches, frame relay switches, multiplexors, de-multiplexors, routers, and the like. The configuration and implementation of the IDN 130 is not particularly important to the present invention, except as otherwise noted herein, and therefore, is simplified for illustrative purposes only.

The control system 128 is also communicatively coupled to a control database 132 to provide storage for and access to network topology, operational status of the network and other information. The control database 132 may be a separate, stand-alone database system or integrated into the control system 128. The control database 132 may comprise memory, a hard drive, a storage system, or the like. Furthermore, the control database 132 may be centralized in a single location or distributed amongst a number of locations.

The IDN 130 is communicatively coupled to the telecommunications network 134. It should be noted that the IDN 130 may be part of or overlapping the telecommunications network 134, but are shown here as two distinct networks for illustrative purposes.

Figure 2:
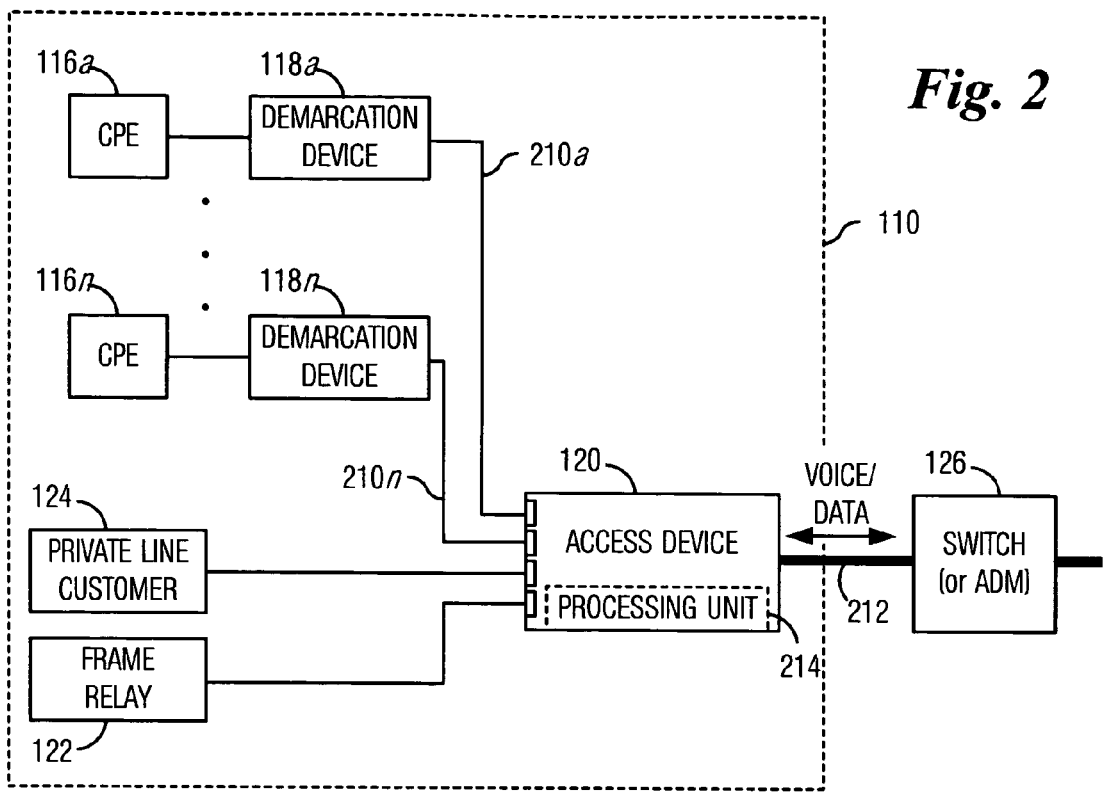
FIG. 2 is a connectivity diagram illustrating communications during normal operating modes in accordance with one embodiment of the present invention.

Referring now to FIG. 2, communications paths are depicted within building 110 prior to an error being detected in accordance with one embodiment of the present invention. The description contained herein is similar for building 112. It should also be noted that the description that follows discusses embodiments of the present invention in which a failed Ethernet link is detected. Other embodiments may detect other type of failed links, such as, for example, the communications links between the access device 120 and frame relay 122 and the private line customer 124.

Prior to an error being detected, communications from the CPE 116a ... 116n to the service edge 114 (FIG. 1) are received by the access device 120. A processing unit 214 within the access device 120 translates, and preferably aggregates, the communications from the Ethernet communications link to an optical link, such as the DS3 communications link 212. Similarly, communications from the service edge 114 (FIG. 1) to the CPE 116a ... 116n are received by the access device 120, which routes the communications from the service edge 114 to the appropriate CPE 116a ... 116n. It should be noted that, when all of the communications links 210a ... 210n are operating, the communications link 212 between the access device 120 and switch 126 (or ADM 127) remains available and handles bidirectional traffic as indicated in FIG. 2.

Figure 3:
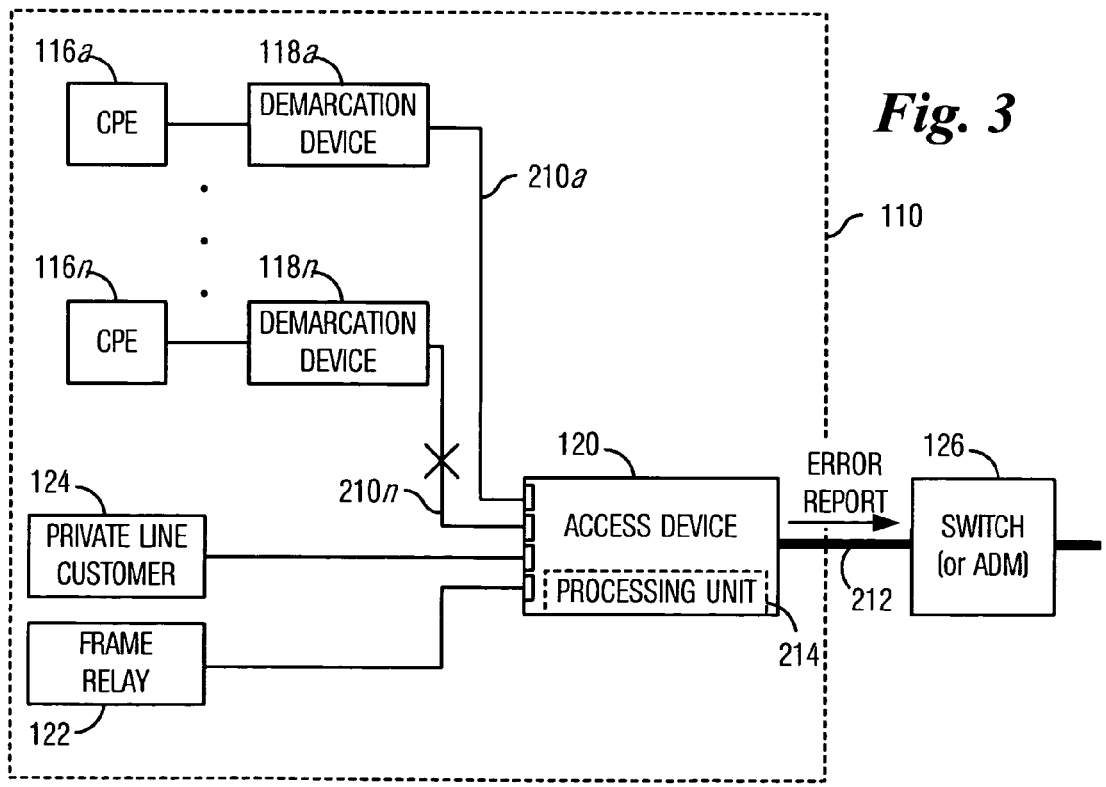
FIG. 3 is a connectivity diagram illustrating communications during a failure mode in accordance with one embodiment of the present invention.

FIG. 3 illustrates the same scenario as illustrated in FIG. 2, except that communications link 210n has failed. In the preferred embodiment, the processing unit 214 of the access device 120 monitors the Ethernet links to the demarcation devices and determines if a "loss-of-link" occurs. Generally, loss-of-link occurs when a connection between the access device 120 and the demarcation device 1118a ... 118n has been lost due to some unknown event, such as equipment failure, a severed cable, or the like. It is preferred that the access device 120 determine loss of link as specified in Institute for Electrical and Electronic Engineers (IEEE) 802.1 series of standards related to LAN bridging and management, which are is incorporated herein by reference.

It should be noted that the present invention is disclosed in terms of loss of link for illustrative purposes. A similar procedure may be used upon detection of other types of errors, fault conditions, events, or the like. In particular, embodiments of the present invention are particularly useful in situations in which an error, fault condition, or other event in the customer building may cause a disruption in service or the generation of errors downstream. The use of the present invention may allow a network service provider to isolate location of a problem to being at a customer location and possibly to the customer side of the access device.

Upon detecting an error, the processing unit 214 notifies downstream network elements, such as switch 126 and service edge 114 of the failed link. In the preferred embodiment, the access device 120 indicates the existence of an error by generating an alarm indication signal (AIS). Generally, AIS is used in telecommunications networks to indicate to downstream network elements that an error occurred somewhere upstream. As discussed in greater detail below with reference to FIG. 5, generating an AIS signal involves setting the X overhead bits to a logic "0," the C overhead bits to a logic "1," and the payload bits to a repeating "10" bit pattern.

It should be noted, however, that in response to generating an AIS signal, the payload on all communications from the access device 120 are replaced with the repeating "10" bit pattern, including operational Ethernet links, private customer links, and frame relay links. Thus, if an AIS signal is generated for one failed Ethernet link, all customer communications between the access device 120 and the service edge 114 will cease. Accordingly, it is preferred that an AIS signal be used in smaller installations or when an error in a critical link has been detected, or the like.

Figure 4:
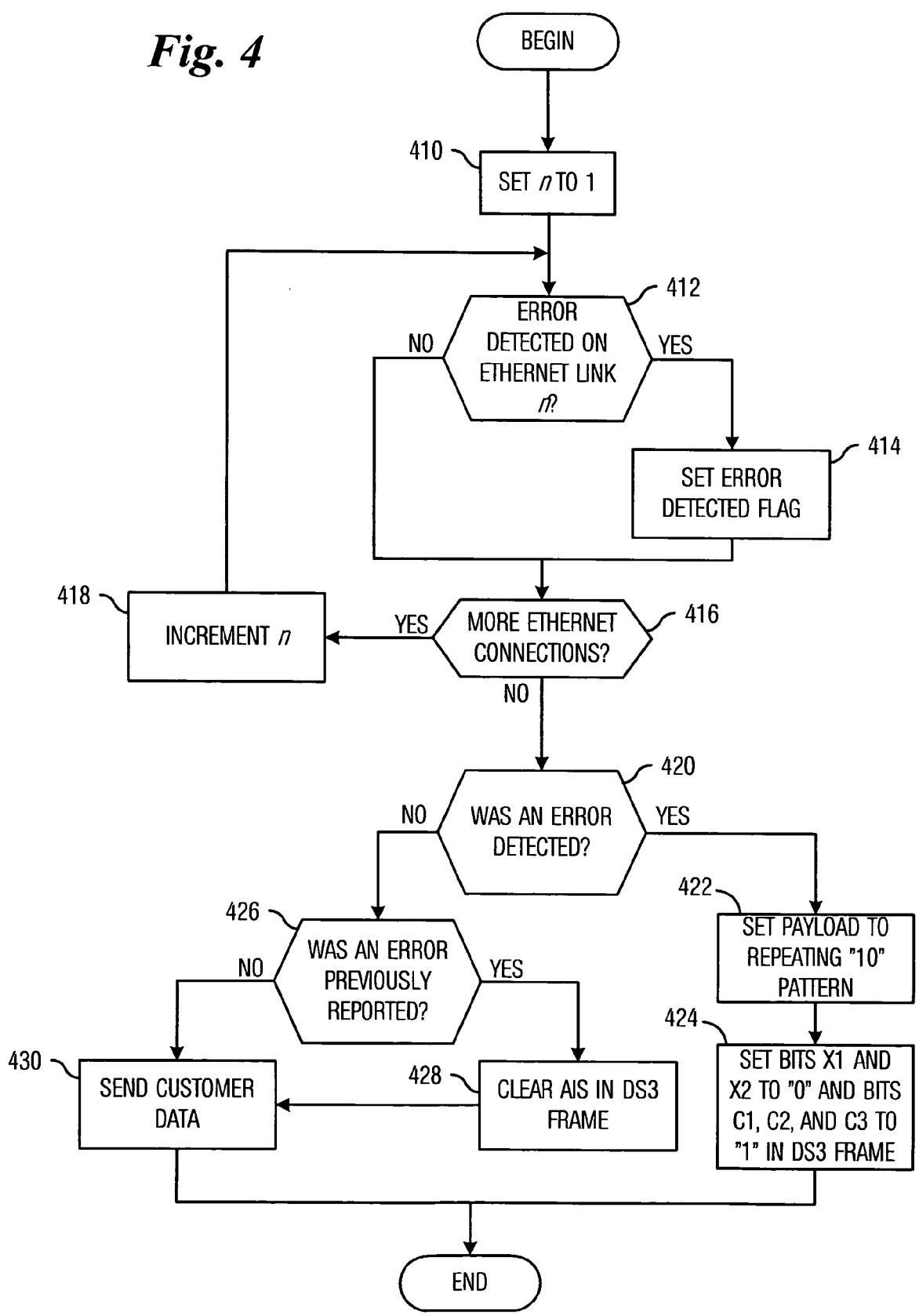
FIG. 4 is a flow chart depicting steps that may be performed to generate an alarm signal in accordance with one embodiment of the present invention.

FIG. 4 is a flow chart depicting steps that may be performed by the processing unit 214 of the access device 120 in accordance with one embodiment of the present invention to detect a loss of link of an Ethernet communications link and to generate an AIS signal. The process begins in step 410 wherein index n is initialized to 1. The index n is utilized to indicate that each Ethernet link is monitored for loss of link. It should be noted that the process is depicted as a sequential flow wherein each Ethernet link is checked sequentially for illustrative purposes only. In practice, it may be desired to monitor the Ethernet links in parallel and to generate an AIS signal on loss of link of any of the Ethernet links.

Next, in step 412, a determination is made whether or not a loss of link has been detected on the Ethernet link n. If a determination is made that a loss of link has been detected on Ethernet link n, then processing proceeds to step 414, wherein an error flag is set indicating that at least one of the Ethernet links is not functioning.

After step 414 or if a determination was made in step 412 that a loss of link was not detected on Ethernet link n, processing proceeds to step 416, wherein a determination is made whether or not more Ethernet connections remain to be checked. If a determination is made that additional Ethernet links remain to be checked, then processing proceeds to step 418, wherein the value of index n is incremented and processing returns to step 412 to process the next link.

After the Ethernet links have been checked, processing proceeds to step 420, wherein a determination is made whether or not an error has been detected. If an error had been detected, then processing proceeds to step 422 where the payload in the STS-1 frame is set to a repeating "10" bit pattern and, in step 424, the X1 and X2 bits are set to a logic "0" and the C1, C2, and C3 bits are set to a logic "1" to indicate an AIS signal.

If, in step 420, a determination is made that an error was not detected on any Ethernet link, then processing proceeds to step 426, wherein a determination is made whether or not an error or an AIS signal was previously reported. If an error was previously reported, then the AIS signal and overhead bits are cleared to indicate that the error condition has been removed and that Ethernet link n is again operational. Thereafter, communications may be resumed as indicated by step 430.

Figure 5:
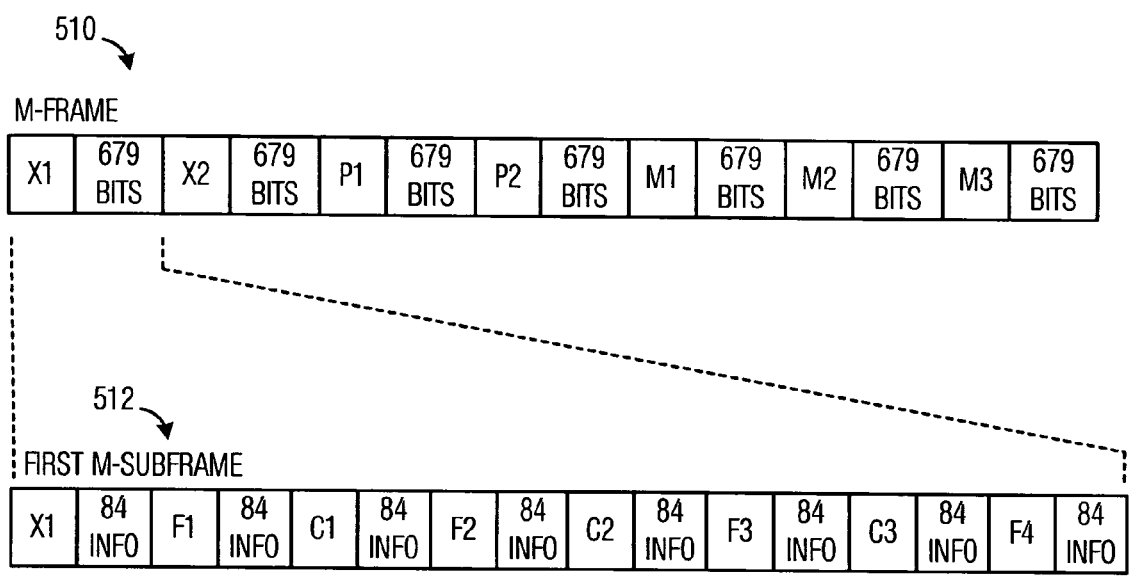
FIG. 5 is a chart of an M-frame and M-subframe of an STS-1 frame that may be used to signal an alarm condition in accordance with one embodiment of the present invention.

Referring now to FIG. 5, an M-frame 510 and a first M-subframe 512 of a DS3 frame that may be set to indicate an AIS signal in response to a failed Ethernet link in accordance with one embodiment of the present invention are illustrated. FIG. 5 depicts the M-frame 510 and the M-subframe 512 as specified by American National Standards Institute recommendation T1.107-2002, which is incorporated herein by reference. Other formats, however, may be used to indicate the loss of link or other error condition on the Ethernet link.

The M-frame 510 comprises seven M-subframes each having 680 bits. Each of the seven M-subframes have eight blocks comprised of an overhead bit and 84 payload bits. The first subframe is illustrated in FIG. 5. The remaining six subframes have a similar format, except that the first overhead bit is different as indicated in the format of the M-frame 510.

When a loss of link is detected on an Ethernet link as discussed above, the X1 and X2 overhead bits in the M-frame 510 are set to a logic "0," and the C1, C2, and C3 bits in each of the seven M-subframes 512 are set to a logic "1." Furthermore, the 84-bit payload contained in each of the seven M-subframes 512 are set to a repeating "10" bit pattern.

Once the error or fault condition is indicated by the generation of the AIS signal, the control system 128 (FIG. 1) may use the information to isolate and diagnose the problem. Because the AIS signal was generated by the access device 120, the service provider will be able to isolate the problem to the customer premise. Additional tests, such as loop-back tests, or the like, may be used to further isolate the problem. If necessary, a truck may be dispatched to the customer premises to perform on-site diagnostics.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. As another example, it will be readily understood by those skilled in the art that the conditions upon which an error signal may be generated may varied while remaining within the scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An access device comprising:
   a processor;
   a first port configured for communicatively coupling to a demarcation device via an Ethernet link;
   a second port configured for communicatively coupling to an add/drop multiplexer (ADM) via a DS-3 communications link, wherein the ADM separates traffic on the DS-3 link from, and integrates onto, the Ethernet link; and a processing unit configured to monitor the first port and to generate an alarm signal on the second port when the processing unit detects that electrical connectivity has been lost due to a loss of the Ethernet link, wherein, the alarm signal is generated using an M-frame of a DS-3 frame, wherein the M-frame has seven M-subframes, each M-subframe has 680 bits divided into blocks 1 through 8, each comprised of an overhead bit and 84 payload bits, and wherein, when the alarm signal is generated, the overhead bit of block 1 of the first and second M-subframes is set to a logic "0", the overhead bit of each of blocks three, five, and seven in each of the seven M-subframes is set to a logic "1", and the 84 payload bits contained in each of the seven M-subframes are set to a repeating "10" bit pattern.

2. The access device of claim 1, wherein the alarm signal is an alarm indication signal (AIS).

3. The access device of claim 1, wherein the processing unit is further configured to restore communications when the electrical connectivity has been restored.

4. The access device of claim 1, wherein the Ethernet link is an $OC_n$ link that is larger than the DS-3 link.

5. A method for indicating a loss of connectivity on an incoming port, the method comprising:
   determining, by detecting a loss of link, that an Ethernet connection to a remote device has been disconnected;
   generating an alarm indicator signal (AIS) on a DS3 communications link; and
   upon determining that an error condition exists in the communications with the remote device:
   determining whether or not the Ethernet connection has been restored; and
   upon determining that the Ethernet connection has been restored, transmitting customer data on the DS3 communications link;
   wherein the DS3 communications link is coupled to an add/drop multiplexer (ADM) and the ADM separates traffic on the DS3 communications link from, and integrates onto, the Ethernet connection,
   wherein, the alarm indicator signal is generated using an M-frame of a DS-3 frame,
   wherein the M-frame has seven M-subframes, each M-subframe has 680 bits divided into blocks 1 through 8, each comprised of an overhead bit and 84 payload bits, and
   wherein, when the alarm indicator signal is generated, the overhead bit of block 1 of the first and second M-subframes is set to a logic "0", the overhead bit of each of blocks three, five, and seven in each of the seven M-subframes is set to a logic "1", and the 84 payload bits contained in each of the seven M-subframes are set to a repeating "10" bit pattern.

6. The method of claim 5, wherein the remote device is customer premise equipment.

7. The method of claim 5, wherein the remote device is a demarcation device, the demarcation device being communicatively coupled to customer premise equipment.

8. The method of claim 5, further comprising continuously transmitting the AIS until the error condition has been removed.

9. A method for indicating the loss of connectivity on an incoming port, the method comprising:
   receiving from a customer premise equipment a first communication on a first communications link, the first communications link being an Ethernet link;
   transmitting the first communication to a service edge over a second communication link, the second communication link being coupled to an add/drop multiplexer (ADM);
   receiving from the service edge a second communication on the second communications link, the second communications link being an optical DS3 communications link;
   transmitting the second communication to the customer premise equipment over the first communication link;
   determining that a loss of the first communications link has occurred; and
   generating an alarm signal on the second communications link;
   wherein the ADM separates traffic on the optical DS3 communications link from, and integrates onto, the Ethernet link,
   wherein, the alarm signal is generated using an M-frame of a DS-3 frame,
   wherein the M-frame has seven M-subframes, each M-subframe has 680 bits divided into blocks 1 through 8, each comprised of an overhead bit and 84 payload bits, and
   wherein, when the alarm signal is generated, the overhead bit of block 1 of the first and second M-subframes is set to a logic "0", the overhead bit of each of blocks three, five, and seven in each of the seven M-subframes is set to a logic "1", and the 84 payload bits contained in each of the seven M-subframes are set to a repeating "10" bit pattern.

10. The method of claim 9, wherein the AIS is transmitted until the error has been resolved.

11. The method of claim 9, wherein the first communications link is coupled to a demarcation device.

12. The method of claim 9, wherein the first communications link is coupled to a customer premise equipment.

13. An access device comprising:
   a processor;
   a first port configured for communicatively coupling to a customer premise equipment; a second port configured for communicatively coupling to an add/drop multiplexer (ADM) via a DS-3 communications link; and
   a processing unit configured for performing the steps:
   monitoring communications to the customer premise equipment on the first port;
   determining whether an error condition exists in the communications with the customer premise equipment on the first port; and
   upon determining that a loss of link exists on the first port, transmitting an alarm signal on the second port;
   wherein the communications with the customer premise equipment is via an Ethernet communications link and the ADM separates traffic on the DS-3 link from, and integrates onto, the Ethernet communications link,
   wherein, the alarm signal is generated using an M-frame of a DS-3 frame, wherein the M-frame has seven M-subframes, each M-subframe has 680 bits divided into blocks 1 through 8, each comprised of an overhead bit and 84 payload bits, and wherein, when the alarm signal is generated, the overhead bit of block 1 of the first and second M-subframes is set to a logic "0", the overhead bit of each of blocks three, five, and seven in each of the seven M-subframes is set to a logic "1", and the 84 payload bits contained in each of the seven M-subframes are set to a repeating "10" bit pattern.

14. The access device of claim 13, wherein the alarm signal is an alarm indicator signal (AIS).

15. The access device of claim 14, wherein the AIS is transmitted until the error condition has been removed.

16. The access device of claim 13, wherein the processing unit is further configured, upon determining that an error condition exists in the communications with the at least one of the customer premise equipment, to perform the steps of:
  determining whether or not the error condition has been removed; and
  upon determining that the error condition has been removed, transmitting customer data on the second port.

17. An access device comprising:
  means, including an Ethernet communications link, for communicatively coupling to a customer premise equipment;
  means for communicatively coupling to an add/drop multiplexer (ADM) via a DS-3 communications link, wherein the ADM separates traffic on the DS-3 link from, and integrates onto, the Ethernet link;
  means for monitoring communications to the customer premise equipment on a first port;
  means for determining whether a loss of link condition exists in the communications between the customer premise equipment on the first port; and
  upon determining that a loss of link condition exists on the first port, means for transmitting an alarm signal to a switch on a second port,
  wherein, the alarm signal is generated using an M-frame of a DS-3 frame,
  wherein the M-frame has seven M-subframes, each M-subframe has 680 bits divided into blocks 1 through 8, each comprised of an overhead bit and 84 payload bits, and
  wherein, when the alarm signal is generated, the overhead bit of block 1 of the first and second M-subframes is set to a logic "0", the overhead bit of each of blocks three, five, and seven in each of the seven M-subframes is set to a logic "1", and the 84 payload bits contained in each of the seven M-subframes are set to a repeating "10" bit pattern.

18. The access device of claim 17, wherein the alarm signal is an alarm indicator signal (AIS).

19. The access device of claim 18, wherein the AIS is transmitted until the error condition has been removed.

20. The access device of claim 17, further comprising, upon determining that an error condition exists in the communications to the customer premise equipment, means for determining whether or not the error condition has been removed and means for transmitting customer data to the network device on the second port upon determining that the error condition has been removed.

21. A network comprising:
  one or more pieces of customer premise equipment (CPE);
  one or more demarcation devices, each of the customer premise equipment being communicatively coupled to at least one demarcation device;
  an access device communicatively coupled to the one or more demarcation devices via one or more Ethernet links, the access device being communicatively coupled to an add/drop multiplexer (ADM) via an optical DS3 communications link, and the access device being configured to generate an alarm signal on an optical link when the access device detects that the one or more Ethernet links is not functioning;
  wherein the ADM separates traffic on the DS-3 link from, and integrates onto, the one or more Ethernet links,
  wherein, the alarm signal is generated using an M-frame of a DS-3 frame,
  wherein the M-frame has seven M-subframes, each M-subframe has 680 bits divided into blocks 1 through 8, each comprised of an overhead bit and 84 payload bits, and
  wherein, when the alarm signal is generated, the overhead bit of block 1 of the first and second M-subframes is set to a logic "0", the overhead bit of each of blocks three, five, and seven in each of the seven M-subframes is set to a logic "1", and the 84 payload bits contained in each of the seven M-subframes are set to a repeating "10" bit pattern.

22. The network of claim 21, wherein the alarm signal is an alarm indication signal (AIS).

* * * * *